United States Patent [19]
Soot

[11] 3,935,606
[45] Feb. 3, 1976

[54] RETRACTABLE SUSPENSION SYSTEM
[76] Inventor: Olaf Soot, 9 Tomahawk Lane, Greenwich, Conn. 06830
[22] Filed: Apr. 5, 1974
[21] Appl. No.: 458,209

Related U.S. Application Data
[63] Continuation-in-part of Ser. No. 379,234, July 16, 1973, abandoned.

[52] U.S. Cl. .................................. 9/1 T; 280/124 R
[51] Int. Cl.² .......................................... B63C 13/00
[58] Field of Search ........ 9/1 T; 267/35; 280/124 R, 280/43, 43.17, 43.2, 43.22

[56] References Cited
UNITED STATES PATENTS
2,781,529  2/1957  Moody ..................................... 9/1 T
2,893,019  7/1959  Renfroe .................................... 9/1 T Primary Examiner—Philip Goodman
Attorney, Agent, or Firm—Rene Oliveras, Esq.

[57] ABSTRACT

A retractable suspension system adaptable for land, water, or amphibious vehicles substantially comprises: a bottom suspension arm having a wheel-axle assembly associated with its first end; a top suspension arm; spring means for interconnecting the arms; a horizontal suspension beam axle fixedly attached to the vehicle frame; and means attached to the vehicle frame and to the first end portion of the top suspension arm for adjusting the rotational orientation of the two arms about the suspension beam axle whose center is coincident with the second ends of the two arms. The suspension system can be partially retracted to accommodate for uneven load distributions on the vehicle and for levelling the vehicle on nonuniform terrain while it can be fully retracted for water use. Straight carry-through members which are extensions of the vehicle frame can be utilized to form the suspension beam axle. In such case, a low pivot point is provided for rotation of the top and bottom suspension arms thereby eliminating the need for complicated secondary framing which would otherwise be required.

6 Claims, 9 Drawing Figures

RETRACTABLE SUSPENSION SYSTEM

This is a continuation-in-part of copending application Ser. No. 379,234 entitled "Amphibious Camper" and filed July 16, 1973, now abandoned.

FIELD OF THE INVENTION

This invention relates to vehicle suspension systems and in particular to such a system including retractable suspension arms.

BACKGROUND OF THE INVENTION

Several prior art land, water, and amphibious vehicles have had suspension systems or undercarriages associated therewith. For example, Johnson U.S. Pat. No. 2,339,782 discloses a sectional boat utilizing wheels which are removable but not retractable. Henningsen U.S. Pat. NO. 2,460,935 describes a boat-trailer combination utilizing a lever mechanism which lifts the wheels when the boat structure is folded open. This system relies on telescoping members for absorbing shocks and can only be used in the fully retracted or fully down positions. Bushfield U.S. Pat. No. 2,588,084 includes a retractable suspension system for a combined trailer-folding boat. This system is of the folding type and apparently does not include any shock absorbing means. Howe U.S. Pat. No. 3,042,942 discloses an amphibious pontoon boat including a retractable suspension system. The shock absorbing system associated therewith utilizes a tension spring. Sideways folding of the wheels does not permit use of the system for supporting the boat at varying levels. Byberg U.S. Pat. No. 3,079,616 discloses a foldable floating platform utilizing a vertical-lift type rack and pinion mechanism for retracting the wheels. No shock absorbing system is included. Stockmann U.S. Pat. No. 3,114,157 discloses a raft including a rather complex supporting mechanism, which mechanism includes numerous parts subject to undue lateral forces. Mycroft U.S. Pat. No. 3,280,785 accomplishes lifting of the wheels by compressing Volkswagen suspension springs thereby pulling the wheels with a cable-tensioning mechanism. Finally, Lusk U.S. Pat. No. 3,738,684 discloses a transportable vehicle including a removable or foldable telescoping undercarriage, which undercarriage can support the vehicle at only one fixed position.

From the above, it is apparent that the prior art suspension systems or undercarriages generally provide at most one or two of the many features which are desirable in a land, water, or amphibious vehicle suspension system. Most of these prior art systems include numerous parts and sliding surfaces subject to wear thereby requiring extensive corrosion protection. Therefore, it is desirable and advantageous to have a unitary suspension system providing all the desired features for land, water, or amphibious applications.

Objects of the present invention are therefore to provide:

a unitary suspension system;

a compact suspension system;

a retractable suspension system;

a retractable suspension system which is readily adaptable for land travel, and stationary and water applications;

a retractable suspension system which is utilizable in camping and boating type vehicles;

an adjustably retractable suspension system;

an adjustably retractable suspension system comprising a minimum number of parts and which is of simple design and economical to manufacture;

a unitary suspension system or undercarriage which is readily adaptable for land, water, or amphibious vehicles;

a suspension system of the above type whose associated wheel need not be removed for water use;

a suspension system of the above type whose associated wheel is fully retractable;

a suspension system of the above type whose associated wheel is adjustably retractable;

a suspension system of the above type including shock absorbing means;

a suspension system of the above type including shock absorbing means of the compressed spring type;

a suspension system of the above type including a jack screw assembly for effecting partial or full retraction of the associated wheel;

a suspension system of the above type including stiff jack screw means for effecting retraction of the associated wheel;

a suspension system of the above type including a minimum number of parts and sliding surfaces; and a suspension system of the above type which is readily adaptable for raising or lowering the associated vehicle.

SUMMARY OF THE INVENTION

According to the present invention, a retractable suspension system adaptable for land, water, or amphibious vehicles substantially comprises: a bottom suspension arm having a wheel-axle assembly associated with its first end; a top suspension arm; spring means for interconnecting the arms; a horizontal suspension beam axle fixedly attached to the vehicle frame; and means attached to the vehicle frame and substantially to the first end of the top suspension arm for adjusting the rotational orientation of the two arms about the suspension beam axle whose center is coincident with the second ends of the two arms.

According to a first illustrative embodiment, a retractable suspension system or undercarriage substantially comprises a wheel and an associated axle; bottom and top suspension arms; a spring; first and second suspension beam axles; and a jack screw assembly including a jack screw, a jack screw nut, a jack screw pivot-bearing, and a crank. The wheel is rotatably mounted onto its associated wheel axle, which axle is horizontal and perpendicular to the venicle's longitudinal direction. The suspension beam axles are horizontal and perpendicular to the vehicle's longitudinal direction. These beam axles are fixed relative to the vehicle frame. The wheel axle is located substantially intermediate the two beam axles. The wheel axle is fixedly attached to the first end of the bottom suspension arm while the first suspension beam axle is rotatably attached to the second end. The bottom suspension arm, which extends along the vehicle's longitudinal direction and which is substantially horizontal during the travel configuration, is therefore rotatable relative to the first suspension beam axle. The first end of the top suspension arm is also rotatably attached to the first suspension beam axle. In other words, the top suspension arm, which also extends along the vehicle's longitudinal direction and which is substantially horizontal during the travel configuration, is also rotatable relative to the first suspension beam axle. Now, the jack screw nut connects the second end of the top suspension arm to an intermediate portion of the jack screw while the jack screw pivot-bearing connects the first or lower end of the jack screw to the second suspension beam axle, as will be hereinafter explained. The crank is fixedly attached to the second or upper end of the jack screw. The second end of the top suspension arm is substantially adjacent the first end of the jack screw during the travel configuration. The two beam axles are part of an internal frame which supports the vehicle. The ends of the beam axles extend to the sides of the vehicle. The first or lower end of the spring is fixedly attached to the first end of the bottom suspension arm while the second or upper end of the spring is fixedly attached to an intermediate portion of the top suspension arm. The spring is substantially vertical during the travel configuration.

The jack screw nut allows for rotation of the jack screw about its own axis and for rotation of the top suspension arm relative to the jack screw whereby the second end of the top suspension arm rides axially along the jack screw. The jack screw pivot-bearing allows for rotation of the jack screw about its own axis and for rotation of the jack screw's first end about the second suspension beam axle.

Now, rotation of the jack screw about its own axis in a first direction causes the second end of the top suspension arm to ride up axially along the jack screw, thereby rotating the top suspension arm about the first suspension beam axle. This, in turn, causes the spring to pull up the first end of the bottom suspension arm, thereby rotating the bottom suspension arm relative to the first suspension beam axle. This, of course, results in the retraction of the wheel axle and its associated wheel. In the retracted configuration, the bottom and top suspension arms are susbstantially vertical while the spring is substantially horizontal. Rotation of the jackscrew in the second direction results in the lowering of the wheel.

The second illustrative embodiment is idential to the first, except that the geometry of the top and bottom suspension arms is modified and the spring is replaced by one or more elastomer compression type springs such as the Lord "Lastosphere" or other similar spring.

According to a third illustrative embodiment, a retractable suspension system or undercarriage substantially comprises a wheel and an associated axle; bottom and top suspension arms; a pivot assembly; first and second suspension beam axles; and a jack screw assembly including a jack screw, a jack screw nut, a jack screw pivot-bearing, and a crank. The wheel, the wheel axle, the first end of the bottom suspension arm, the first and second ends of the top suspension arm, the jack screw nut, the jack screw pivot-bearing, the jack screw, and the crank are substantially related to each other and to the vehicle frame as before. In this embodiment, the pivot assembly includes a U-shaped member and a cylindrical torsional elastomer spring assembly. The U-shaped member has first and second vertically extending portions and an interconnecting hollow lower portion. The elastomer spring assembly further includes a laterally directed central shaft, a hollow cylindrical elastomer member fixedly attached to the central shaft, and a thin cylindrical outer sleeve fixedly attached to the elastomer member. The ends of the inner central shaft are fixedly attached to the extending portions. The first suspension beam axle fits into the lower hollow portion of the U-shaped member and is rotatable with respect thereto. The second end of the bottom suspension arm is rigidly attached to the outer sleeve while the first end of the top suspension arm is rigidly attached to one of the vertically extending portions. Again, rotation of the jack screw about its axis in a first direction results in the retraction of the wheel and its associated axle into the wheel well while rotation of the jack screw in the second direction reults in the lowering of the wheel.

Features of the present invention are therefore that:

the top suspension arm remains stationary while the bottom suspension arm rotates relative to the first suspension beam axle in response to shock loads received by the associated wheel;

retraction is effected by rotating the top suspension arm relative to the first suspension beam axle;

retraction is effected by applying a moment to the top suspension arm thereby causing rotation of such arm relative to the first suspension beam axle;

steel or elastomer springs located between the top and bottom suspension arms absorb the shock loads received by the wheel;

the main shock absorbing element is not subjected to load when the suspension system is in the fully retracted position;

the first suspension beam axle about which the suspension arms rotate provides a low pivot point;

the jack screw portion located between the second suspension beam axle and the second end of the top suspension arm is always in tension;

the associated shock absorbing system is not subjected to load when the suspension system is in the fully retracted position; and utilizing straight carry through members to form the suspension beam axles provides low pivot points for the top and bottom suspension arms thereby always maintaining the jack screw in tension.

Advantages of the present invention are therefore that:

the retractable suspension system is includable in a compact structure;

the suspension system is readily adaptable and advantageously utilized in either land, water, or amphibious vehicles;

the retractable suspension suspension system is economical to manufacture and to maintain in that it comprises a minimum number of parts and sliding surfaces which are subject to wear and corrosion;

the suspension system is of the adjustably retractable type thereby being adaptable for accommodating uneven load distributions on the vehicle and for levelling the vehicle on nonuniform terrain;

the suspension system is adjustably retractable even while under load;

the suspension system is readily adaptable for land transportation, stationary use, vehicle launching and water use;

the suspension system can be retracted during water use in order to minimize water drag;

the suspension system can support wheel loads at any partially retracted position;

the wheels associated with the suspension system are fully retractable and therefore need not be removed for water use;

the shock absorbing system can utilize either metal or elastomer springs;

the retractable suspension system can easily be mounted to prealigned pivot points located on the vehicle frame;

the low pivot points provided by the suspension beam axles allow for positive wheel alignment and ease of system assembly;

forming the suspension beam axles from straight carrythrough members located below the vehicle floor eliminates complicated secondary framing which would otherwise be necessary; and the wheels associated with the suspension system can easily be removed and replaced by skis for travel on snow.

DESCRIPTION OF THE DRAWING

Other objects, features, and advantages of the present invention will be better appreciated by a consideration of the following detailed description and the drawing in which:

FIG. 8 is a side view of a third illustrative embodiment of a retractable suspension system according to the present invention, while

DETAILED DESCRIPTION

Figure 1:
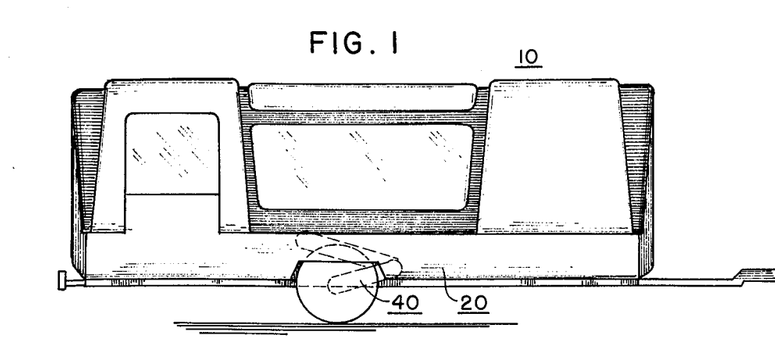
FIG. 1 is a side view of an amphibious vehicle in its travel configuration utilizing a retractable suspension system according to the present invention.

FIG. 1 is a side view of an amphibious vehicle in its travel configuration utilizing a retractable suspension system according to the present invention. Amphibious vehicle 10 includes vehicle body 20 which houses retractable suspension system 40 of the present invention. In this conconfiguration, the wheels associated with system 40 are at their lowermost position.

Figure 2:
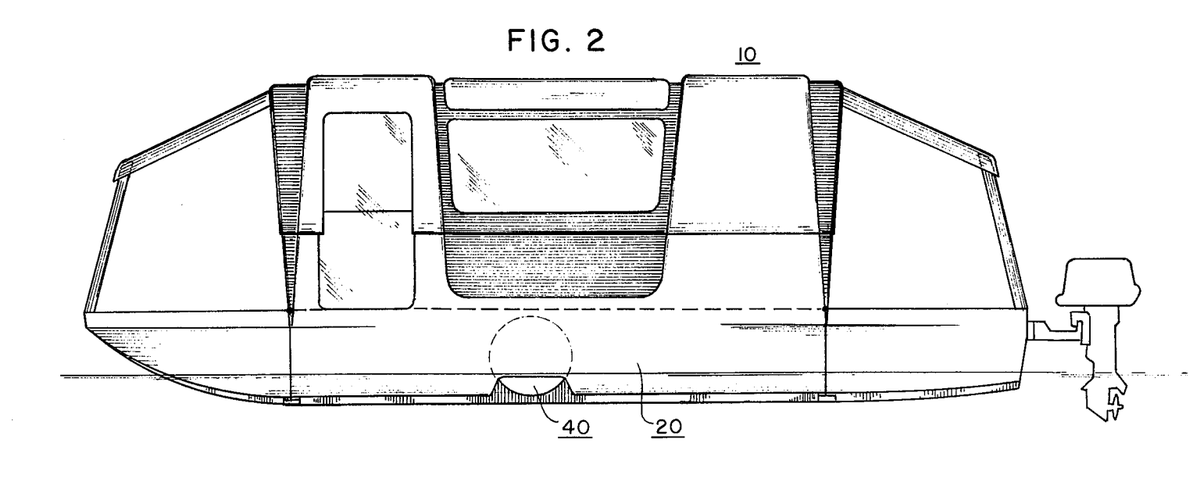
FIG. 2 is a side view of the same vehicle in its boating configuration.

FIG. 2 is a side view of vehicle 10 in its boating configuration. In this configuration, the wheels associated with system 40 are in their fully retracted position.

Figure 3:
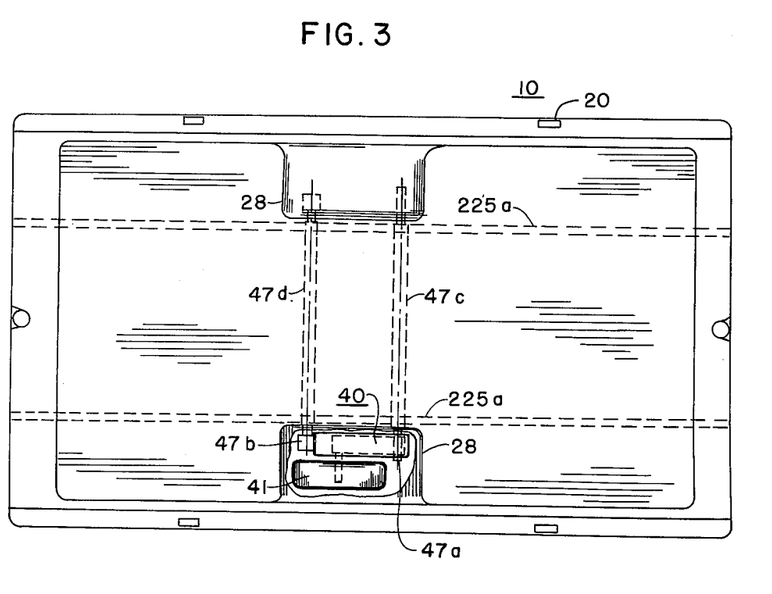
FIG. 3 is a top partially cross-sectional view of the same vehicle illustrative of the relationship between the retractable suspension system and the vehicle frame.

FIG. 3 is a top partially cross-sectional view of vehicle 10 illustrative of the relationship between system 40 and the vehicle frame. In vehicle body 20, the frame within the floor comprises longitudinal members 225a and lateral straight carry-through members 47c and 47d, to which suspension beam axles 47a and 47b of system 40 are rigidly fastened, as will be hereinafter described in detail. Wheel 41 of system 40 is housed within well 28 of vehicle body 20, as will also be hereinafter described in detail.

Vehicle 10 of FIGS. 1, 2, and 3 is disclosed in copending application Ser. No. 379234 entitled "Amphibious Camper", and filed July 16, 1973. While retractable suspension system 40 of the present invention is described in relation to vehicle 10, it will be apparent to those skilled in the art that system 40 could advantageously be utilized with any other suitable land, water, or amphibious vehicle.

Figure 4:
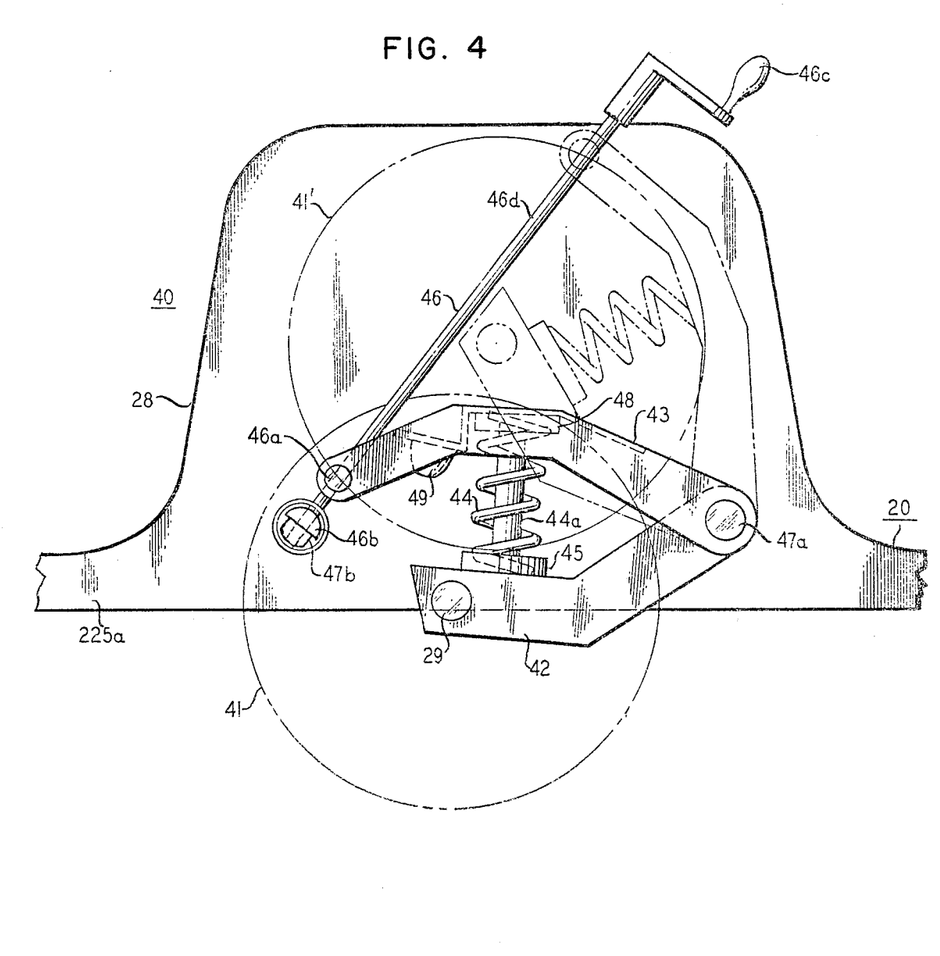
FIG. 4 is a side view of a first illustrative embodiment of a retractable suspension system according to the present invention.
Figure 6:
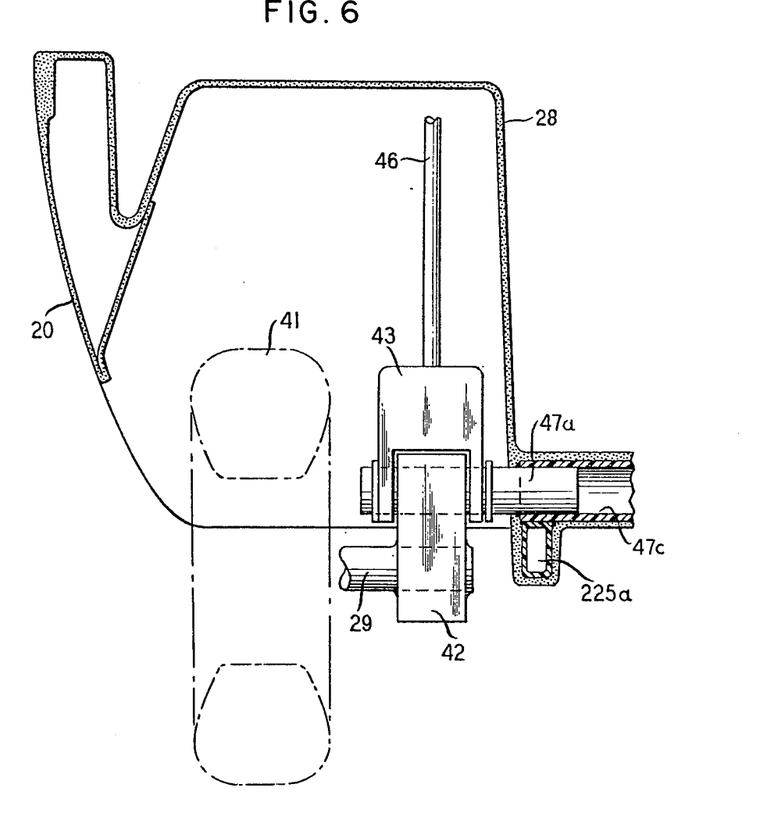
FIGS. 6 and 7 are end partially cross-sectional views through the first and second suspension beam axles of the retractable suspension systems shown in FIGS. 4 and 5.
Figure 7:
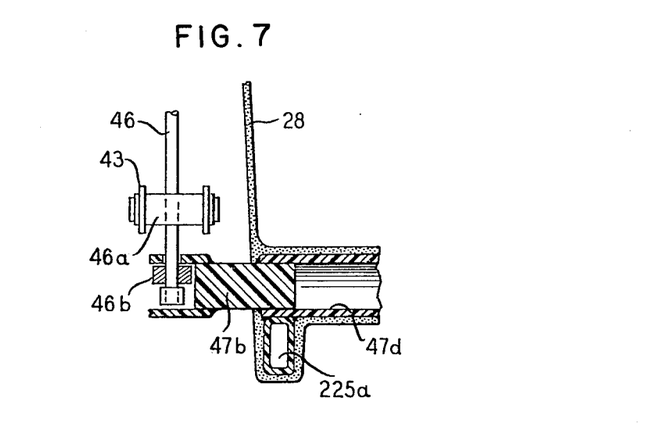

FIG. 4 is a side view of a first illustrative embodiment of a retractable suspension system according to the present invention. FIGS. 6 and 7 are, in turn, end partially cross-sectional views through the system's first and second suspension beam axles. Retractable suspension system 40 substantially comprises wheel 41 and associated axle 29; bottom and top suspension arms 42 and 43, respectively; spring 44 and associated shock absorber 44a; first and second suspension beam axles 47a and 47b, respectively; and jack screw assembly 46 including jack screw 46d, jack screw nut 46a, jack screw pivot-bearing 46b, and crank 46c. Wheel 41 is rotatably mounted onto associated axle 29, which wheel axle is horizontal and perpendicular to the vehicle's longitudinal direction. Suspension beam axles 47a and 47b are also horizontal and perpendicular to such longitudinal direction. These suspension beam axles are fixed relative to vehicle body 20. Wheel axle 29 is normally located substantially intermediate the two suspension beam axles. Wheel axle 29 is fixedly attached to the first end of bottom suspension arm 42 while first suspension beam axle 47a is rotatably attached to the second end. Bottom suspension arm 42, which extends along the vehicle's longitudinal direction and which is substantially horizontal during the travel configuration, is therefore rotatable relative to the first suspension beam axle 47a. The first end of top suspension arm 43 is also rotatably attached to first suspension beam axle 47a. In other words, top suspension arm 43, which also extends along the vehicle's longitudinal direction and which is substantially horizontal during the travel configuration, is also rotatable relative to first suspension beam axle 47a. Now, jack screw nut 46a connects the second end of top suspension arm 43 to an intermediate portion of jack screw 46d while jack screw pivot-bearing 46b connects the first or lower end of the jack screw to second suspension beam axle 47b, as will be hereinafter explained. Crank 46c is attached to the second or upper end of jack screw 46d. The second end of the top suspension arm 43 is substantially adjacent the first end of jack screw 46d during the travel configuration. The first or lower end of spring 44 is fixedly attached via retainer 45 to the first end of bottom suspension arm 42 while the second or upper end of the spring is fixedly attached via retainer 48 to an intermediate portion of top suspension arm 43. Spring 44 is substantially vertical during the travel configuration. Bumper 49, which is attached to top suspension arm 43, prevents contact between the two suspension arms while shock absorber 44a damps the arms' relative motion. Suspension beam axles 47a and 47b are part of the aforementioned internal frame which supports vehicle body 20. The ends of suspension beam axles 47a and 47b extend into wheel wells 28 located along the sides of vehicle body 20.

Jack screw nut 46a allows for rotation of jack screw 46d about its own axis and for rotation of top suspension arm 43 about suspension beam axle 47a whereby the second end of the top suspension arm rides axially along the jack screw. Jack screw pivot-bearing 46b allows for rotation of jack screw 46d about its own axis and for rotation of the jack screw's first end about second suspension beam axle 47b.

Now, rotation of jack screw 46d about its own axis in a first direction causes the seceond end of top suspension arm 43 to ride up axially along the jack screw, thereby rotating the top suspension arm about first suspension beam axle 47a. This, in turn, causes spring 44 to pull up the first end of bottom suspension arm 42, thereby rotating the bottom suspension arm relative to first suspension beam axle 47a. This, of course, results in the retraction of wheel axle 29 and associated wheel 41 up into wheel well 28 of vehicle body 20. This is illustrated by position 41' of the wheel. In the retracted configuration, bottom and top suspension arms 42 and 43 are substantially vertical while spring 44 is substantially horizontal. Rotation of jack screw 46d in the second direction results in the lowering of wheel 41. The threads of jack screw 46d are advantageously self-locking with respect to jack screw 46a. This means that wheel 41 can support vehicle body 20 at any intermediate position between the wheel's lowermost and retracted positions because nut 46a would not slide or rotate jack screw 46d when a load is applied to jack screw 46d via nut 46a. For additional safety, an external locking device, not shown, can also be utilized to further prevent rotation of jack screw 46d under excessive vibration.

In the alternative, shock absorber 44a can be placed externally of spring 44. Thus, an adjustable compressed air suspension unit, not shown, can be placed inside spring 44 thereby allowing adjustment of suspension system 40 to compensate for varying load or terrain conditions. Furthermore, crank 46c can be placed at a remote location and connected to jack screw 46d by any means of flexible or universal joint shafting, not shown. If desired, crank 46c can be replaced by a motor, not shown. Also, the second end of bottom suspension arm 42 can be rotatably attached to the first end of top suspension arm 43 by means of a separate pivot, not shown, instead of attaching suspension beam axle 47a directly to the second end of bottom suspension arm 42. In either case, vibration mounts, not shown, could also be associated with the separate pivot attachment.

Figure 5:
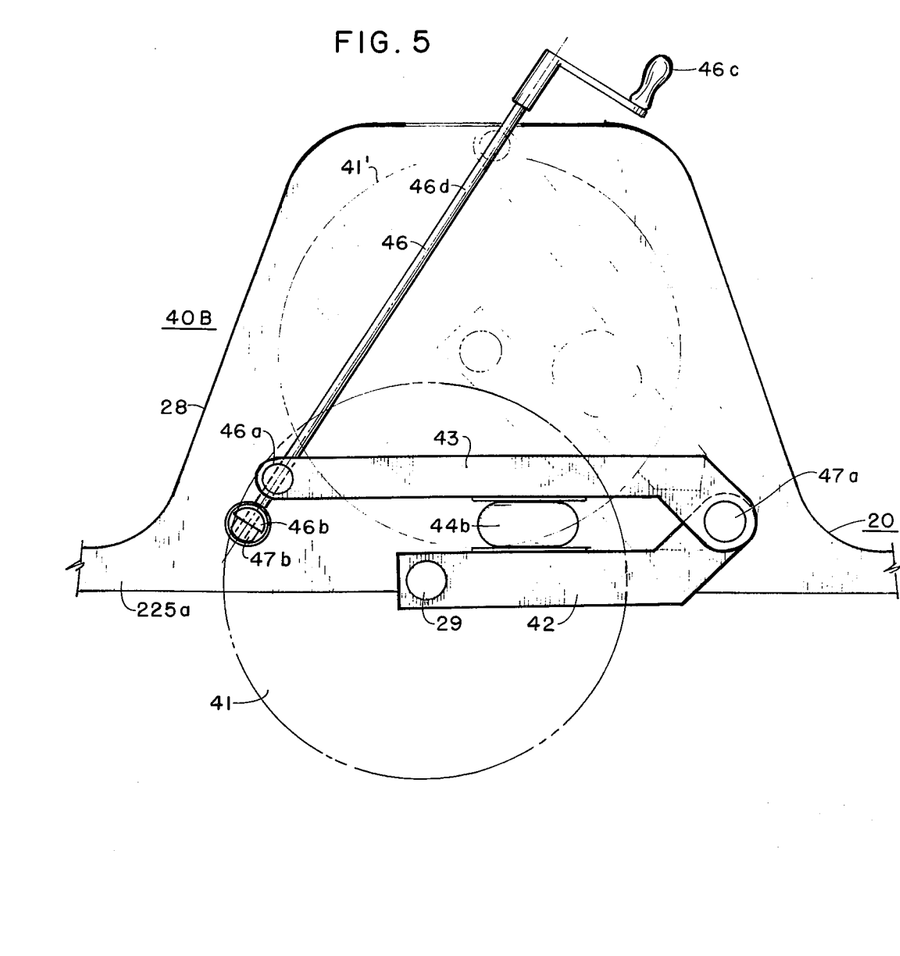
FIG. 5 is the side view of a second illustrative embodiment of a retractable suspension system according to the present invention.

FIG. 5 is a side view of a second illustrative embodiment of a retractable suspension system according to the present invention. FIGS. 6 and 7 are, in turn, end partially cross-sectional views through the system's first and second suspension beam axles. Retractable suspension system 40B is similar to system 40, except that spring 44 and associated retainers 45 and 48 are replaced by at least one elastomer compression spring 44b, such as the Lord "Lastophere" or other similar spring. Bumper 49 is eliminated and the geometry of bottom and top suspension arms 42 and 43 is modified to suit elastomer compression spring 44b. A shock absorber, not shown, can also be added to the system in between the top and bottom suspension arms. The operation of system 40B is substantially the same as that of system 40.

Figure 8:
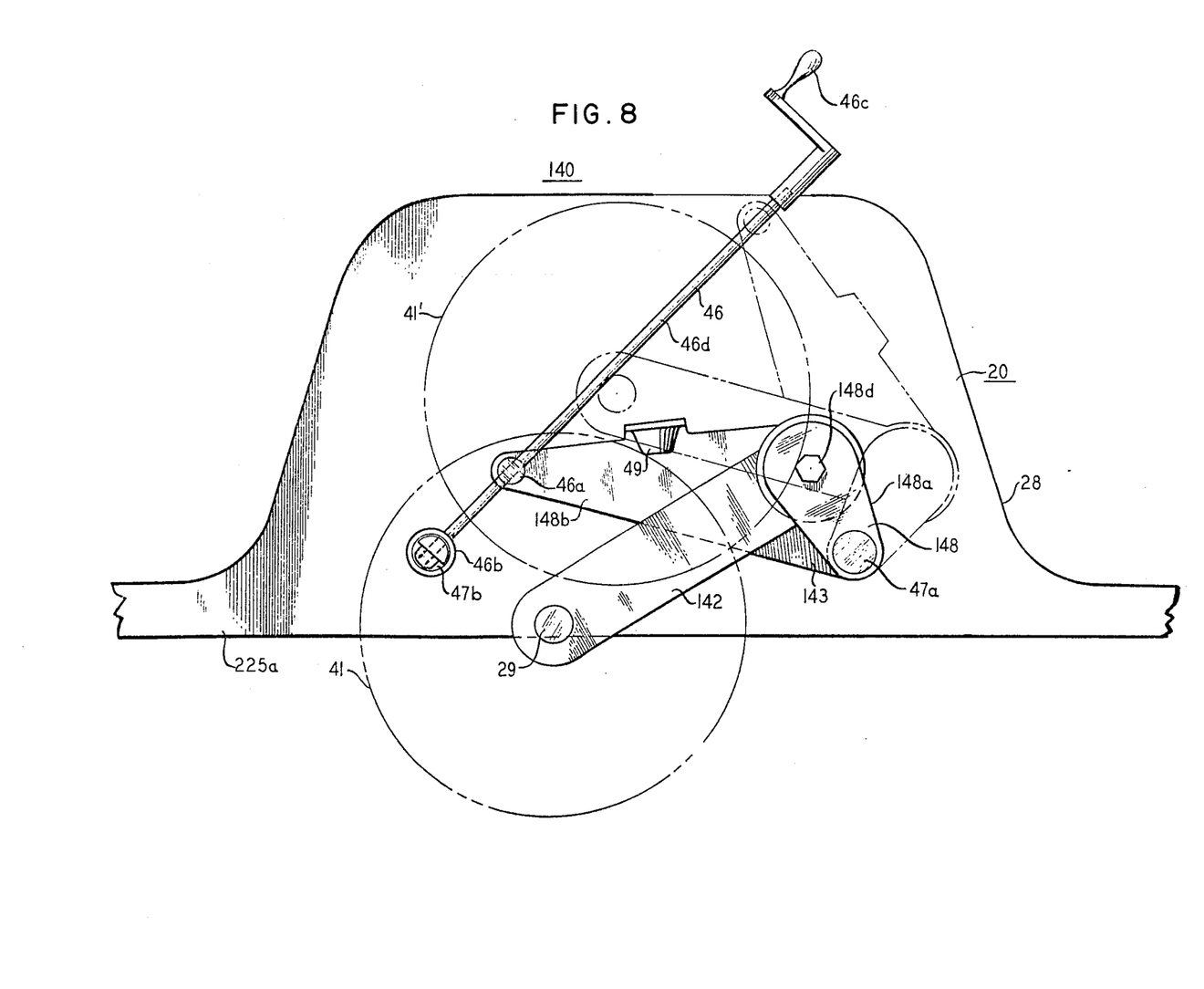
Figure 9:
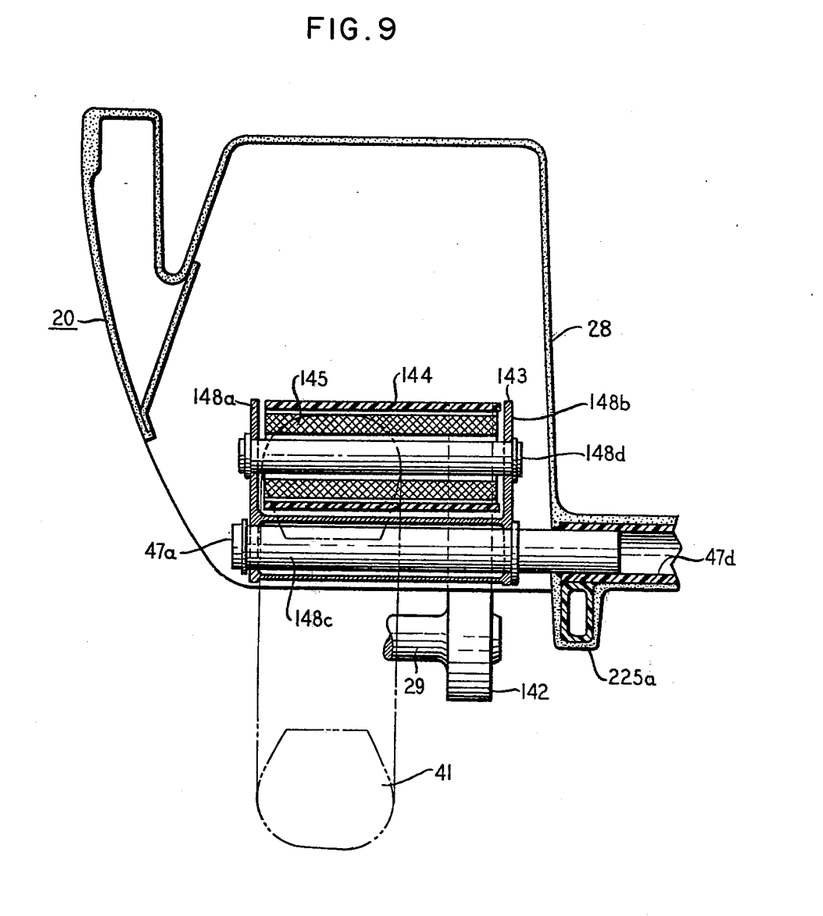
FIG. 9 is an end partially cross-sectional view through the system's first suspension beam axle.

FIG. 8 is a side view of a third illustrative embodiment of a retractable suspension system according to the present invention, while FIG. 9 is an end partially cross-sectional view through the system's first suspension beam axle. Retractable suspension system 140 substantially comprises wheel 41 and associated axle 29; bottom and top suspension arms 142 and 143, respectively, and associated pivot assembly 148; first and second suspension beam axles 47a and 47b, respectively; and jack screw assembly 46 including jack screw 46d, jack screw bearing-pivot 46b, and crank 46c. The wheel, wheel axle, the first end of the bottom suspension arm, the first and second ends of the top suspension arm, the jack screw nut, the jack screw pivot-bearing, the jack screw, and the crank are substantially related to each other and to vehicle body 20 as before. Bumper 49 of the top suspension arm also serves a similar function.

In this embodiment, pivot assembly 148 includes a U-shaped member associated with arm 143 and a cylindrical, torsional elastomer spring assembly associated with arm 142. The U-shaped member has first and second vertically extending portions 148a and 148b interconnecting hollow lower portion 148c. The torsional elastomer spring assembly further includes laterally directed inner central shaft 148d, hollow cylindrical elastomer member 145 fixedly attached to the central shaft, and thin cylindrical outer sleeve 144 attached to the elastomer member. The ends of inner central shaft 148d are fixedly attached to extending portions 148a and 148b. Lower hollow portion 148c of the U-shaped member has first suspension beam axle 47a inserted therethrough and is rotatable with respect to such axle. The second end of bottom suspension arm 142 is rigidly attached to outer sleeve 144 while the first end of top suspension arm 143 is rigidly attached to extending portion 148b. In this particular embodiment, it is apparent that outer sleeve 144 is built integrally with bottom suspension arm 142 while extending portions 148a and 148b and hollow lower portion 148c are built integrally with top suspension arm 143.

Again, rotation of jack screw 46d about its axis in a first direction results in the retraction of wheel 41 to position 41' while rotation of the jack screw in the second direction results in lowering of the wheel. Again, suspension beam axles 47a and 47b and respectively associated frame members 47c and 47d are part of a rigid frame which supports vehicle body 20 while the vehicle is being supported by wheel 41.

A feature of the present invention is that suspension beam axles 47a and 47b provide low pivot points. This allows for use of stiff straight- through members 47c and 47d as part of the vehicle body support frame and for maintaining jack screw 46d in tension.

While the retractable suspension system of the present invention has been described in terms of specific illustrative embodiments, it will be apparent those skilled in the art that many modifications are possible within the spirit and scope of the disclosed principle.

What is claimed is:

1. A retractable suspension system comprising:
a first nonrotatable horizontal suspension beam axle member,
a movable horizontal axle member which is parallel to said first suspension beam axle member,
a first suspension arm member, the first end thereof being fixedly attached to one end of said horizontal axle member and the second end thereof being rotatably attached to said first suspension beam axle member, said horizontal axle member being attached only at said one end and being perpendicular to said first suspension arm member,
a second suspension arm member, the first end thereof also being rotatably attached to said first suspension beam axle member, said first and second suspension arm members defining and being located within a vertical plane,
spring means interconnecting said first and second suspension arm members, said spring means being located directly above said first suspension arm member and directly below said second suspension arm member, and means attached to said second suspension arm member for adjusting the rotational orientation thereof relative to said first suspension beam axle member, whereby actuation of said adjusting means causes said horizontal axle member to be selectively raised or lowered relative to said first suspension beam axle member.

2. The rectractable suspension system of claim 1 also comprising:

a second nonrotatable horizontal suspension beam axle member, said second suspension beam axle member being parallel to said first suspension beam axle member and being fixed relative thereto, said adjusting means also being attached to said second suspension beam axle member.

3. The retractable suspension system of claim 1 wherein said spring means is of the linear-displacement type, the first end of said spring means being fixedly attached to the first end of said first suspension arm member and the second end being attached to an intermediate portion of said second suspension arm member.

4. The retractable suspension system of claim 1 wherein said spring means is of the torsional-displacement type, said spring means rotationally interconnecting the second end of said first suspension arm member and the first end of said second suspension arm member substantially adjacent said first suspension beam axle member.

5. The retractable suspension system of claim 1 also comprising:

a second nonrotatable horizontal suspension beam axle member, said second suspension beam axle member being parallel to said first suspension beam axle member and being fixed relative thereto; and wherein said adjusting means further comprises:

a jack screw member, first pivot means connecting the second end of said second suspension arm member to an intermediate point of said jack screw member, said first pivot means allowing rotation of said jack screw member about its own longitudinal axis and allowing rotation of said second suspension arm member about said first suspension beam axle member; and second pivot means connecting one end of said jack screw member of said second suspension beam axle member, said second pivot means allowing rotation of said jack screw member about its own longiudinal axis and allowing rotational displacement of said jack screw member about said second suspension beam axle member, whereby rotation of said jack screw member about its own longitudinal axis rotates said second suspension arm member about said first suspension beam axle member and, in turn, rotates said first suspension arm member about said first suspension beam axle member thereby controllably raising or lowering said horizontal axle member.

6. The retractable suspension system of claim 1 wherein said spring means comprises at least one elastomer member interconnecting said first suspension arm member and said second suspension arm member.

* * * * *